United States Patent [19]
Tanaka et al.

[11] Patent Number: 5,920,592
[45] Date of Patent: Jul. 6, 1999

[54] DATA TRANSMITTER-RECEIVER

[75] Inventors: Masahiko Tanaka; Kenji Okita, both of Tokyo, Japan

[73] Assignee: NEC Corporation, Tokyo, Japan

[21] Appl. No.: 08/816,316

[22] Filed: Mar. 13, 1997

[30] Foreign Application Priority Data

Mar. 13, 1996 [JP] Japan .................................. 8-055942

[51] Int. Cl.$^6$ .............................. H04B 1/38; H04B 1/16
[52] U.S. Cl. .......................... 375/220; 375/219; 455/343
[58] Field of Search .................................. 375/220, 219, 375/254, 346; 455/343, 575, 38.3, 310

[56] References Cited

U.S. PATENT DOCUMENTS

| | | | |
|---|---|---|---|
| 5,058,203 | 10/1991 | Inagami | 455/574 |
| 5,142,684 | 8/1992 | Perry et al. | 395/750 |
| 5,142,699 | 8/1992 | Sato et al. | 455/343 |
| 5,187,471 | 2/1993 | Wagai et al. | 340/825.44 |
| 5,426,755 | 6/1995 | Yokouchi et al. | 395/425 |
| 5,628,001 | 5/1997 | Cepuran | 395/556 |

FOREIGN PATENT DOCUMENTS

| | | |
|---|---|---|
| 0 351 230 A2 | 1/1990 | European Pat. Off. . |
| 0 447 302 A1 | 9/1991 | European Pat. Off. . |
| 0 661 892 A2 | 7/1995 | European Pat. Off. . |
| 3-23725 | 1/1991 | Japan . |
| 2297884 | 8/1996 | United Kingdom . |

*Primary Examiner*—Chi H. Pham
*Assistant Examiner*—Khai Tran
*Attorney, Agent, or Firm*—Scully, Scott, Murphy & Presser

[57] ABSTRACT

A data transmitter-receiver for reducing high-frequency noise which leads to a cause of performance deterioration of a radio instrument, and for eliminating dissipation current. The data transmitter-receiver transmits transmitting data to a modulator-demodulator connected to a radio instrument, and receives receiving data from the modulator-demodulator. A terminal controlling section 3 of the data transmitter-receiver performs data processing on the receiving data, thus outputting to a data-terminal, and performs data processing transmitting signal from the data-terminal, thus generating the receiving data. The terminal controlling section causes the low-speed clock LC to generate on the clock generating section during transmission-reception-period both of the receiving data and the transmitting data, and causes the high-speed clock HC to generate on the clock generating section during non-transmission-reception-period both of the receiving data and the transmitting data, both the high-speed clock and the low-speed clock are operating-clock. Furthermore, the operating ratio detector causes the low-speed clock to generate when the operating ratio of the terminal controlling section is low.

10 Claims, 3 Drawing Sheets

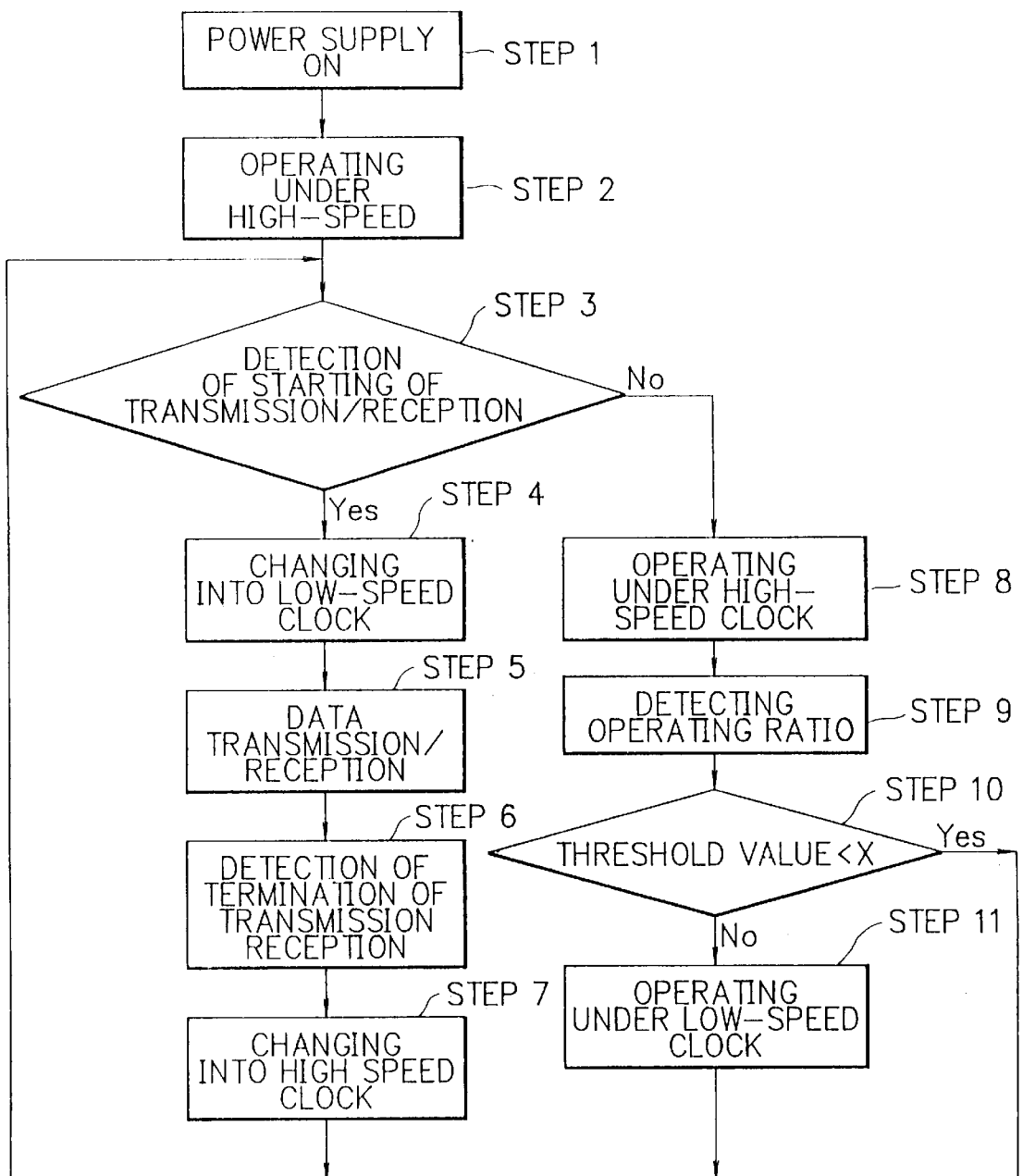

DATA TRANSMITTER-RECEIVER

BACKGROUND OF THE INVENTION

The present invention relates to a data transmitter-receiver. More to particularly, the present invention relates to a novel and improved data transmitter-receiver which receives receiving data from a radio instrument, while which transmits transmitting data to the radio instrument, for communicating between communication partner using radio signal in the portable radio equipment or the like.

DESCRIPTION OF THE PRIOR ART

As the conventional data transmitter-receiver of this type, the Japanese Patent Application Laid-Open No. Hei 3-23725 "MOBILE RADIO COMMUNICATION DEVICE" is illustrated. The MOBILE RADIO COMMUNICATION DEVICE discloses the battery saving method. In this battery saving method, it allows operating-clock of a terminal controlling section to switch to two steps of low-speed clock and high-speed clock. The terminal controlling section performs data-processing on both of the receiving data and the transmitting data. The MOBILE RADIO COMMUNICATION DEVICE causes the terminal controlling section to operate with the high-speed clock during both of reception-period of the receiving data and transmission-period of the transmitting data, and also causes the terminal controlling section to operate with the low-speed clock during period exception for the above both of the reception-period or the transmission-period, so that the battery saving is performed.

The data transmitter-receiver as described above is required to improve its performance and its function in regard to the terminal controlling section. Firstly, speedup of processing-the terminal controlling section. Firstly, speedup of processing-speed of the terminal controlling section is required. However as the processing time becomes fast, high-frequency noise generated from the terminal controlling section is increased. The disclosed conventional MOBILE RADIO COMMUNICATION DEVICE succeeds in battery saving namely, succeeds in reduction of dissipation of the current. In this constitution of the MOBILE RADIO COMMUNICATION DEVICE, operating-load of the terminal controlling section reaches the maximum value thereof during transmission-reception-period both of the receiving data and the transmitting data. When the data is transmitted and received, the high-frequency noise generated by the terminal controlling section also reaches the maximum value. The high-frequency noise generated by the terminal controlling section is also propagated to the radio instrument connected to the data transmitter-receiver. The propagation of the high-frequency noise inspires deterioration of receiving noise factor of the receiving section of the radio instrument and increasing of distortion of transmitting data to be transmitted from the transmitting section or the like. These are the large factors causing the performance of the radio instrument to deteriorate. It is required to reduce generation of such factors.

SUMMARY OF THE INVENTION

In view of the foregoing, it is an object of the present invention to provide a data transmitter-receiver which implements battery saving effectively, and which can reduce generation of the high-frequency noise to be factors of performance-deterioration of the radio instrument during both of reception-period of the receiving data and transmission-period of the transmitting data.

According to one aspect of the present invention, for achieving the above-mentioned object, there is provided a data transmitter-receiver for receiving the receiving data from a radio instrument and for transmitting the transmitting data to the radio instrument using radio signal between communication partner. The data transmitter-receiver has data transmission-reception-period detecting means for detecting both of reception-period of the receiving data and transmission-period of the transmitting data. The data transmitter-receiver has a clock generating section for generating a first clock and for generating a second clock whose speed is lower than the first clock. The data transmitter-receiver has clock changing means for causing the first clock to generate on the clock generating section during both of non-reception-period of the receiving data and non-transmission-period of the transmitting data, or for causing the second clock to generate on the clock generating section during both of reception-period of the receiving data and transmission-period of the transmitting data. The data transmitter-receiver has terminal controlling means which operate under either the first clock or the second clock, which perform data processing on the receiving data, thus outputting to a data-terminal, and which perform data processing on the transmitting data from the data-terminal, thus generating the transmitting data.

According to the another aspect of the invention, in the above-described data transmitter-receiver, the data transmitter-receiver further comprises a buffer memory for accumulating the receiving data temporarily from the radio instrument, thus sending the accumulated receiving data to the terminal controlling means.

According to the another aspect of the invention, in the above-described data transmitter-receiver, wherein both of the receiving data and the transmitting data have a data-starting flag at the front of signal and a data-terminating flag at the rear thereof each, the data transmission-reception-period detecting means detect the reception-period of the receiving data and the transmission-period of the transmitting data due to the detection both of the data-starting flag and the data terminating flag.

According to the another aspect of the invention, in the above-described data transmitter-receiver, the data transmitter-receiver further comprises an operating ratio detector causing the second clock to generate on the clock generating section when the operating ratio of the terminal controlling means is lower than a prescribed threshold value during both of non-reception-period of the receiving data and non-transmission-period of the transmitting data too.

As stated above, the data transmitter-receiver according to the invention allows the clock provided for the terminal controlling means to switch from the high-speed clock to the low-speed clock during both of reception-period of the receiving data being received from the radio instrument and transmission-period of the transmitting data transmitting to the radio instrument. The data transmitter-receiver causes the high-frequency noise propagating from the terminal controlling means to the radio instrument to reduce, thus reducing deterioration caused by the high-frequency noise of the radio instrument. In spite both of non-reception-period of the receiving data and non-transmission period of the transmitting data, when the operation ratio of the terminal controlling means is lower than the prescribed threshold value, it allows the terminal controlling means to operate with the low-speed clock, thus implementing the battery saving.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 4 is a flow-sheet showing a clock speed control of the embodiment of FIG. 1.

DETAILED DESCRIPTION OF THE PREFERRED EMBODIMENT

A preferred embodiment of the invention will now be described in detail referring to the accompanying drawings.

Figure 1:
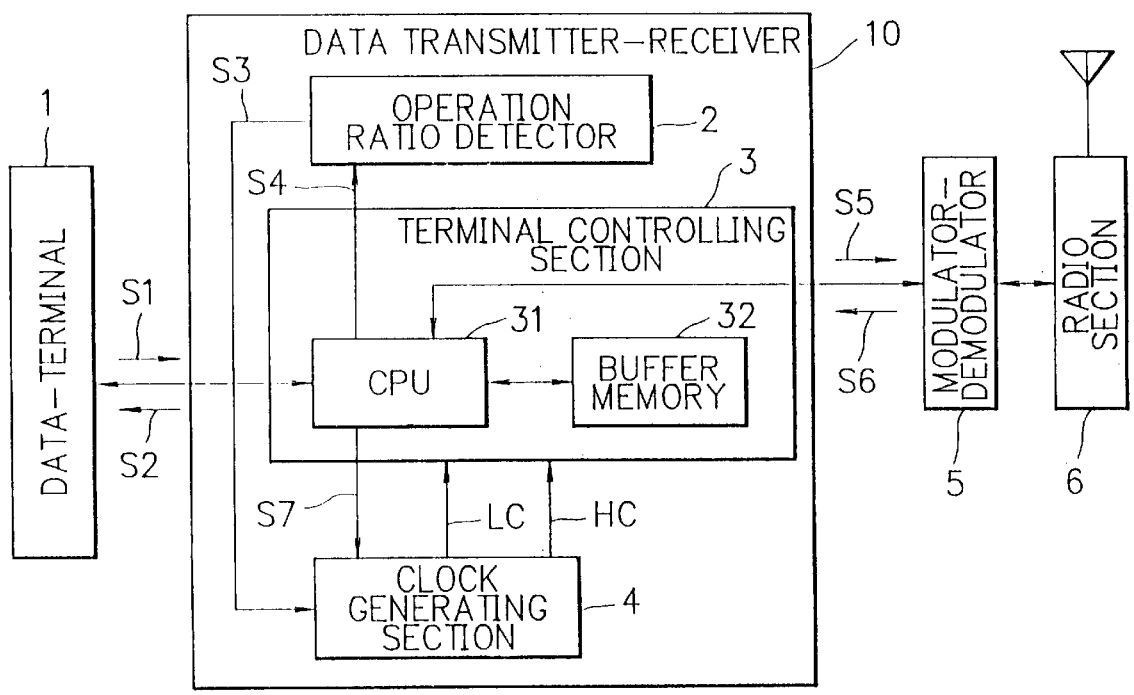
FIG. 1 is a block diagram showing a portable radio equipment employing a data transmitter-receiver 10 according to one embodiment of the present invention.
Figure 2:
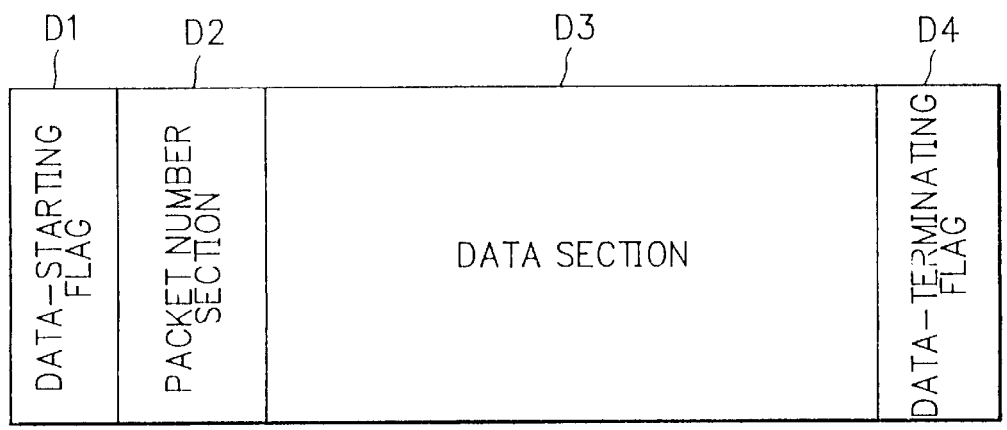
FIG. 2 is a view showing a signal format of a receiving data S6 and a transmitting data S5 which are transmitted and received by the data transmitter-receiver 10 of FIG. 1.

FIG. 1 is a block diagram showing a portable radio instrument employing a data transmitter-receiver 10 according to one embodiment of the present invention, and FIG. 2 is a view showing a signal format of a receiving data S6 and a transmitting data S5 which are transmitted and received by the data transmitter-receiver 10 of FIG. 1.

A portable radio equipment comprises a modulator-demodulator 5 and a radio instrument 6 both of which form a radio equipment, a data transmitter-receiver 10 which receives receiving data S5 from the modulator-demodulator 5 and which transmits transmitting data S6 to the modulator-demodulator 5, and a data terminal 1 having a function of user interface. The radio instrument 6 converts a receiving radio signal from the communication partner into a receiving intermediate frequency signal, thus transmitting to the modulator-demodulator 5. The modulator-demodulator 5 demodulates the receiving intermediate frequency signal, thus generating the receiving data S6. The modulator-demodulator 5 modulates transmitting data S5 from the data transmitter-receiver 10 into transmitting intermediate frequency signal. The radio instrument 6 converts the transmitting intermediate frequency signal into transmitting radio signal, before transmitting the transmitting radio signal to the communication partner. Here referring to FIG. 2, the receiving data S6 which has the same signal format as that of the transmitting data S5 equips the signal format such that a data-starting flag D1 is positioned in the forefront of the signal, a packet number section D2 is positioned in the second place thereof, a data section D3 is positioned in the third place thereof, and a data terminating flag D4 is positioned in the tail thereof.

A transmitting signal S1 is generated by a data-terminal 1 in response to data which is supplied by a user. The data-terminal 1 sends the transmitting signal S1 to the data transmitter-receiver 10. Besides, the transmitting signal S1 is accumulated temporarily by the built-in buffer memory of the data-terminal 1 until when the transmitting signal S1 is directed to transmit by the transmitter-receiver 10. The receiving data S6 is subjected to data processing by the data transmitter-receiver 10, thus converting into receiving signal S2. The data-terminal 1 receives the receiving signal S2 from the data transmitter-receiver 10. The data-terminal 1 provides data which is corresponding to the receiving signal S2 for the user.

The data transmitter-receiver 10 comprises a terminal controlling section 3 consisting of a micro processor (hereinafter CPU) 31 and a buffer memory 32, a clock generating section 4, and an operating ratio detector 4. The terminal controlling section 3 comprises a peripheral circuit for operating the CPU 31 smoothly, for example a ROM for storing an operating program, and a RAM and so forth for storing operation-data temporarily. The buffer memory 32 accumulates the receiving data S6 which is received from a modulator-demodulator 5 through the CPU 31. Then the accumulated receiving data S6 is read out on the CPU 31. The clock generating section 4 produces either high-speed clock HC or low-speed clock LC due to control both of clock-changing signal S7 (S7a and S7b) from the CPU 31 and clock-control signal S3 from the operating ratio detector 2.

The power supply of the portable radio equipment is switched on. The CPU 31 supplies the clock-changing signal S3 in order to generate the high-speed clock HC to the clock generating section 4. The terminal controlling section 3 operates under the high-speed clock HC. Now, the radio instrument 6 receives the receiving radio signal from the communication partner. The receiving data S6 from the modulator-demodulator 5 is supplied to the CPU 31. The CPU 31 causes the receiving data S6 to accumulate temporarily to the buffer memory 32. The CPU 31 detects the data-starting flag D1 from the receiving data S6. The clock changing signal S7a allows the generated clock to change the high-speed clock HC into the low-speed clock LC. When the CPU 31 detects the data-starting flag D1, the CPU 31 sends the clock-changing signal 37a to the clock generating section 4. The clock generating section 4 supplies the low-speed clock LC to the terminal controlling section 3. The terminal controlling section 3 operates under the low-speed clock LC. The clock-changing signal S7b allows the generated clock to change the low-speed clock LC into the high-speed clock HC. Receiving of the receiving data S6 lasts, and lastly when the data-terminating flag D4 is received, the CPU 31 sends the clock changing signal 37b to the clock generating section 4. The terminal controlling section 3 operates again under the high-speed clock HC.

While the terminal controlling section 3 receives the high-speed clock HC, namely, while the terminal controlling section 3 does not receives the receiving data S6, the terminal controlling section 3 performs various terminal processing such as reading out the receiving data S6 from the buffer memory 32 and the data processing thereof and so forth. Furthermore while the terminal controlling section 3 receives the low-speed clock LC, namely while the terminal controlling section 3 receives the receiving data S6, the above stated various processing are performed under the low-speed clock LC. When the terminal processing are performed under the low speed clock LC, there occurs not much high-frequency noise. Therefore, there is not much performance degradation of the radio instrument 6 by propagation of the injurious high-frequency noise from the CPU 32 and the terminal controlling section 3 to the modulator-demodulator 5 and the radio instrument 6. The receiving signal S2 is obtained by data-processing of the receiving data S6. The terminal controlling section 3 sends the receiving signal S2 to the data-terminal 1.

The built-in buffer memory of the data-terminal 1 is accumulated temporarily in the transmitting signal S1. The terminal controlling section 3 performs scheduling of the transmitting signal S1. Based upon the transmitting-demand of the transmitting signal S1 from the data-terminal 1, the CPU 31 of the terminal controlling section 3 performs the data-processing on the transmitting signal S1, while receiving data S6 is not received. During period of the transmitting-demand of the transmitting signal S1, the CPU 31 produces the transmitting data S5, thus sending the transmitting data S5 to the modulator-demodulator 5. The terminal controlling section 3 operates under the high-speed clock HC during period of the data-processing of the transmitting signal S1. However, at the time of transmission-starting of the transmitting data S5, the terminal controlling section 3 detects the data-starting flag D1 of the transmitting data S5, thus sending the clock changing signal S7a from the CPU 31. As a result, the terminal controlling section 3 operates under the low-speed clock LC during period of transmission for the transmitting data S5. The terminal controlling section 3 terminates the sending of the transmitting data S5, before detecting the data-terminating flag D4. The terminal controlling section 3 sends the clock changing signal S7b from the CPU 31. The terminal controlling section 3 operates again under the high-speed clock HC.

The data transmitter-receiver 10 also performs battery-saving action. When the terminal controlling section 3 operates under the high-speed clock HC, namely both while the transmitting data S5 is not transmitted and the receiving data S6 is not received, an operating ratio detector 2 detects an operating ratio of the terminal controlling section 3 based upon the power supply current S4 of the CPU 31. It is not necessary to operate the terminal controlling section 3 under the high-speed clock HC, when the operating ratio is smaller than a threshold value X. Consequently the operating ratio detector 2 sends a clock controlling signal S3a to the clock generating section 4. The clock generating section 4 outputs the low-speed clock LC. As a result, the terminal controlling section 3 operates under the low-speed clock LC, so that the battery-saving is implemented. When the operating ratio detector 2 detects the operating ratio which is larger than the threshold value X under the condition that the terminal controlling section 3 operates under the low-speed clock LC, the operating ratio detector 2 sends the clock controlling signal S3b to the clock generating section 4 in order to operate the terminal controlling section 3 under the high-speed clock HC. Besides, it is proper that the threshold value is decided as the high operating ratio when a large quantity of data-processions are required in the terminal controlling section 3, for example, when the terminal controlling section 3 implements the data-procession both of the transmitting signal S1 and the receiving data S6.

Figure 3:
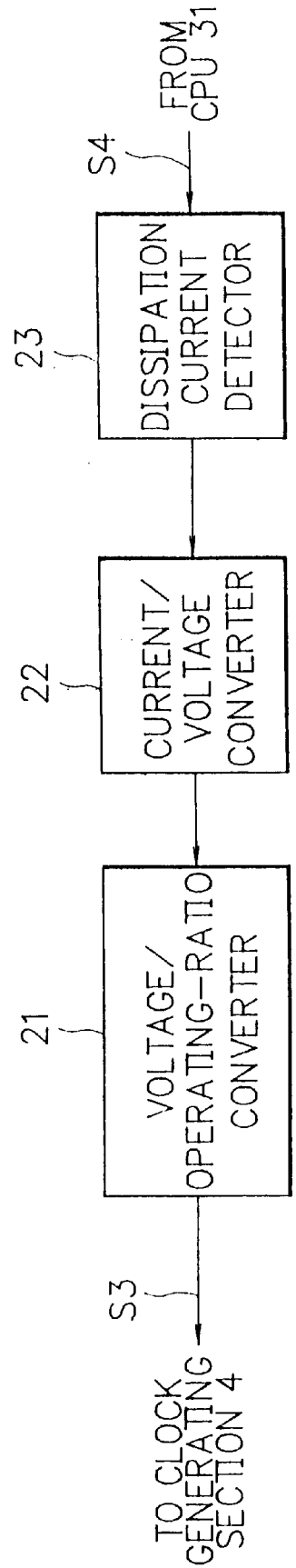
FIG. 3 is a detailed block diagram showing an operating ratio detector 2 used for the data transmitter-receiver 10.

FIG. 3 is a detailed block diagram showing the operating ratio detector 2.

The power supply current S3 of the CPU 31 is easy to be influenced mostly by the operating ratio of the terminal controlling section 3. A dissipation current detector 21 detects the power supply current. The dissipation current detector 21 integrates the power supply current during required period, thus outputting the average power supply current. The average power supply current is converted into a comparison voltage by the current/voltage converter 22. The comparison voltage is compared with a prescribed voltage corresponding to the operating ratio X on the voltage/operating-ratio converter 21. The clock controlling signal S3a causes the low-speed clock LC to output on the clock generating section 4. The clock controlling signal S3b causes the high-speed clock to output on the clock generating section 4. When the comparison voltage is lower than the prescribed voltage, the voltage/operating-ratio converter 21 outputs the clock controlling signal S3a to the clock generating section 4. When the comparison voltage is higher than the prescribed voltage, the voltage/operating-ratio converter 21 outputs the clock controlling signal S3b to the clock generating section 4.

FIG. 4 is the flow-chart showing the clock speed control according to the embodiment of FIG. 1.

The power supply of the data transmitter-receiver 10 is switched on (STEP 1). The CPU 31 supplies the clock changing signal S3 to the clock generating section 4 in order to perform starting of the data transmitter-receiver 10 in the minimum time. The terminal controlling section 3 operates under the high-speed clock HC (STEP 2). The receiving data S6 from the modulator-demodulator 5 is supplied both to the CPU 31 and the buffer memory 32. The CPU 31 detects the data-starting flag D1 from the receiving data S6, thus recognizing this period as the reception-period of the receiving data S6 (Yes of STEP 3). The transmitting data S5 from the modulator-demodulator 5 is supplied both to the CPU 31 and the buffer memory 32. The CPU 31 detects the data-starting flag D1 from the transmitting data S5, thus recognizing this period as the transmission-period of the transmitting data S5 (Yes of STEP 3). And then, the CPU 31 sends the clock changing signal S7a to the clock generating section 4, thus causing the generated clock to change the high-speed clock HC into the low-speed clock LC, with the result that the terminal controlling section 3 operates under the low-speed clock LC (STEP 4).

The reception of the receiving data S6 or the transmission of the transmitting data S5 lasts (STEP 5). The CPU 31 receives finally the data-terminating flag D4. The CPU 31 recognizes either the termination of receiving of the receiving data S6 or the termination of the transmitting of the transmitting data S5 (STEP 6). And then the CPU 31 sends the clock changing signal S7b to the clock generating section 4, thus causing the generated clock to change into the high-speed clock HC, with the result that the terminal controlling section 3 operates again under the high-speed clock HC (STEP 7). After that time, the terminal controlling section 3 returns to the STEP 3. The terminal controlling section 3 waits for the detection either the reception starting of the receiving data S6 or the transmission starting of the transmitting data S5.

In the STEP 3, when the terminal controlling section 3 detects neither the reception starting of the receiving data S6 nor the transmission starting of the transmitting data S5 (No of STEP 3), the terminal controlling section 3 operates under the high-speed clock HC (STEP 8). When the terminal controlling section 3 operates under the high-speed clock HC, the CPU 31 permits that the operating ratio detector detects the power supply current so that the operating ratio detector 2 detects the operating ratio of the terminal controlling section 3 from the power supply current of the CPU 31 (STEP 10). When the operating ratio of the terminal controlling section 3 is higher than the threshold value X, the operating ratio detector 2 sends out no clock controlling signal S3 (Yes of STEP 10). The flow returns to the STEP 3. The terminal controlling section 3 operates under the high-speed clock HC. On the other hand, In the STEP 10, when the operating ratio of the terminal controlling section 3 is lower than the threshold value X (No of STEP 10), the operating ratio detector 2 sends out the clock controlling signal S3a, so that the terminal controlling section 3 operates under the low-speed clock LC (STEP 11). After that time, the flow returns to the STEP 3, thus repeating the above-stated flow.

Besides, the data transmitter-receiver 10 according to the above-stated embodiment of FIG. 1 performs the detection both of the reception-start and the reception-termination of the receiving data S6 through the terminal controlling section 3. However, if a reception-sensitive section which has the same function as that of the terminal controlling section 3 is connected to the modulator-demodulator 5, the detection for the receiving data is capable of performing too.

As described above, according to the present invention, the transmitter-receiver is constructed by the following members and functioned. The data transmission-reception-period detecting means detect both of the reception-period of the receiving data and the transmission-period of the transmitting data. The clock generating section generates the first clock (high-speed clock) and the second clock (low-speed clock) whose speed is lower than the first clock. The clock changing means generates the first clock on the clock generating section during both of the non reception-period of the receiving data and the non-transmission-period of the transmitting data, while the clock changing means generate the second clock on the clock generating section during both of the reception-period of the receiving data and the transmission-period of the transmitting data. The terminal controlling means operate under either the first clock or the second clock. The terminal controlling means perform the data-processing to the receiving data, thus outputting it to the data-terminal, while the terminal controlling means perform the data-processing to the transmitting signal from the data-terminal into the transmitting data. For these reasons, there is the effect that even if the terminal controlling means operate under high-speed procession, transmitting-receiving both for the transmitting data and the receiving data is capable of performing exception for the influence of the high-frequency noise generated by the terminal controlling means.

Furthermore, according to the present invention, there is the effect that the dissipation current of the terminal controlling section is capable of reducing due to the fact that when the operating ratio of the terminal controlling section is low, the operating ratio detector which generates the low-speed clock on the clock generating section is provided.

While preferred embodiments of the invention have been described using specific terms, such description is for illustrative purpose only, and it is to be understood that changes and variations may be made without departing from the spirit or scope of the following claims.

What is claimed is:

1. A data transmitter-receiver which receives receiving data from a radio instrument, while which transmits transmitting data to the radio instrument between communication partner using radio signal comprising:

data transmission-reception-period detecting means for detecting both of reception-period of the receiving data and transmission-period of the transmitting data;

a clock generating section for generating a first clock and for generating a second clock whose speed is lower than speed of said first clock;

clock changing means which cause said first clock to generate on said clock generating section during both of non-reception-period of said receiving data and non-transmission-period of said transmitting data, and which cause said second clock to generate on said clock generating section during both of reception-period of said receiving data and transmission-period of said transmitting data; and terminal controlling means which operate under either said first clock or said second clock, which perform data processing on said receiving data, thus outputting processed data to data-terminal, and which perform data processing on the transmitting data from said data-terminal, thus causing said transmitting data to generate.

2. A data transmitter-receiver according to claim 1, further comprising a buffer memory for accumulating said receiving data temporarily from said radio instrument, thus sending the accumulated receiving data to said terminal controlling means.

3. A data transmitter-receiver according to claim 1, wherein both of said receiving data and said transmitting data have a data-starting flag at the front of signal and a data-terminating flag at the rear thereof each, said data transmission-reception-period detecting means detect said reception-period of said receiving data and said transmission-period of said transmitting data due to detecting both of said data-starting flag and said data-terminating flag.

4. A data transmitter-receiver according to claim 1, further comprising an operating ratio detector causing said second clock to generate on said clock generating section when the operating ratio of said terminal controlling means is lower than a prescribed threshold value during both of non-reception-period of said receiving data and non-transmission-period of said transmitting data too.

5. A data transmitter-receiver according to claim 1, further comprising a reception-detecting section connected to a modulator-demodulator for detecting both of reception starting and reception termination of the receiving data.

6. A method of data transmitting-receiving for data transmitter-receiver which receives receiving data from a radio instrument, while which transmits transmitting data to the radio instrument between communication partner using radio signal comprising the steps of:

detecting both of reception-period of the receiving data and transmission-period of the transmitting data;

generating a first clock and generating a second clock whose speed is lower than the first clock;

allowing said first clock to generate on said clock generating section during both of non-reception-period of said receiving data and non-transmission-period of said transmitting data, while allowing said second clock to generate on said clock generating section during both of reception-period of said receiving data and transmission-period of said transmitting data; and performing data processing on the receiving data, thus outputting to data-terminal, while performing data processing on the transmitting data from a data-terminal, thus generating said transmitting data.

7. A method of claim 6 wherein step of scheduling of the transmitting signal comprises the steps of:

accumulating temporarily the transmitting signal within the built-in buffer memory of the data-terminal;

performing data processing on the transmitting signal by the CPU of the terminal controlling section based upon the transmitting demand of the transmitting signal from the data-terminal, before producing transmitting data;

sending the transmitting data to the modulator-demodulator;

detecting the data-starting flag of the transmitting data at the time of transmission starting of the transmitting data, while the terminal controlling section operates under the high-speed clock during period of data processing of the transmitting signal;

sending the clock changing signal from the CPU, with the result that the terminal controlling section operates under the low-speed clock during period of transmission for the transmitting data;

terminating sending of the transmitting data, before detecting the data-terminating flag; and sending the clock changing signal from the CPU, with the result that the terminal controlling section operates again under the high-speed clock.

8. A method of claim 6 wherein step of battery saving comprises the steps of:

detecting an operating ratio of the terminal controlling section based upon the power supply current of the CPU when the terminal controlling section operates under the high-speed clock HC, namely both while the transmitting data is not transmitted and the receiving data is not received;

sending a clock controlling signal to the clock generating section when the operating ratio is smaller than a threshold value; and outputting the low-speed clock of the clock generating section so that the terminal controlling section operates under the low-speed clock.

9. A method of claim 6 wherein step of operating ratio detecting comprises the steps of:

detecting the power supply current of the CPU which is easy to be influenced mostly by the operating ratio of the terminal controlling section;

integrating the power supply current during required period, thus outputting the average power supply current;

converting the average power supply current into a comparison voltage by the current/voltage converter;

comparing the comparison voltage with a prescribed voltage corresponding to the operating ratio on the voltage/operating-ratio converter; and outputting the clock controlling signal causing the low-speed clock to output on the clock generating section when the comparison voltage is lower than the prescribed voltage, or outputting the clock controlling signal causing the high-speed clock to output on the clock generating section when the comparison voltage is higher than the prescribed voltage.

10. A method of claim 6 wherein step of clock speed controlling comprises the steps of:

supplying the clock changing signal to the clock generating section in order to perform starting of the data transmitter-receiver in the minimum time, thus the terminal controlling section operating under the high-speed clock;

supplying the receiving/transmitting data from the modulator-demodulator both to the CPU and the buffer memory;

detecting the data-starting flag from the receiving/transmitting data, thus recognizing this period as the reception/transmission-period of the receiving/transmitting data;

sending the clock changing signal to the clock generating section, thus causing the generated clock to change the high-speed clock into the low-speed clock, with the result that the terminal controlling section operates under the low-speed clock;

recognizing either the termination of receiving of the receiving data or the termination of transmitting of the transmitting data when the CPU receives finally the data-terminating flag; and sending the clock changing signal to the clock generating section, thus causing the generated clock to change into the high-speed clock, with the result that the terminal controlling section operates again under the high-speed clock.

* * * * *